May 14, 1946.　　　B. F. KENYON　　　2,400,121
TORQUE-CONTROLLED LIQUID TORQUE DRIVE
Filed Jan. 28, 1942　　　3 Sheets-Sheet 1
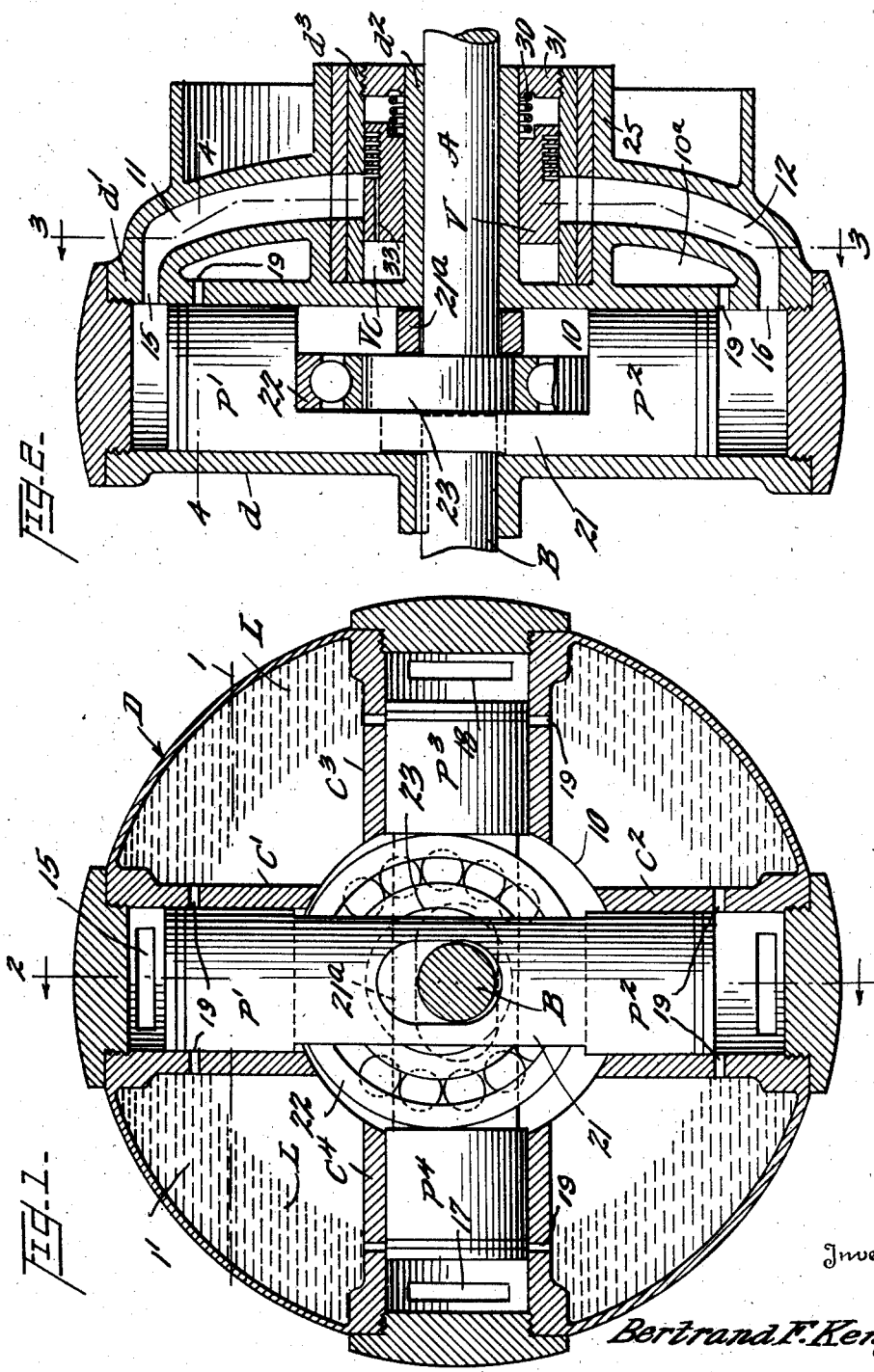

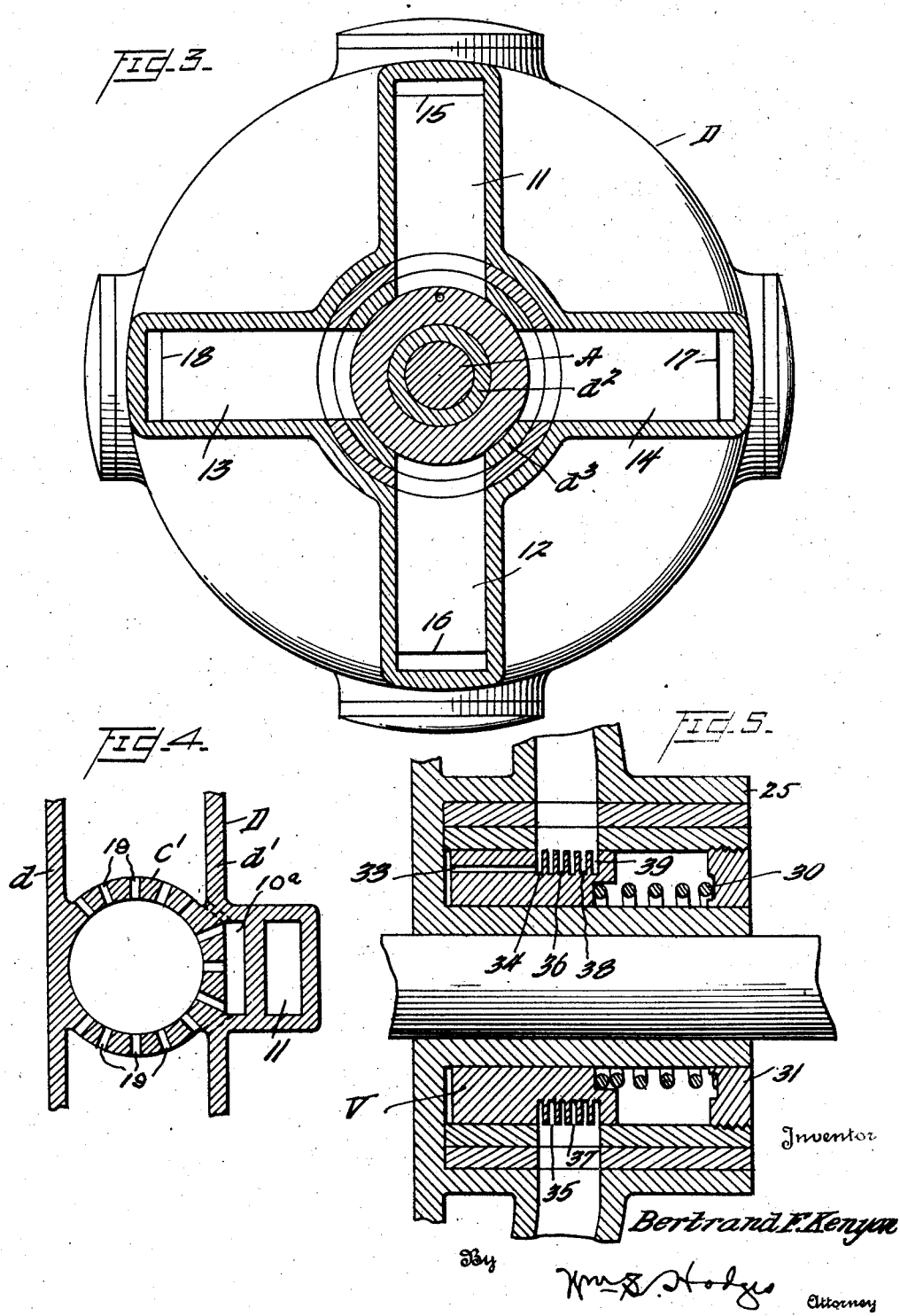

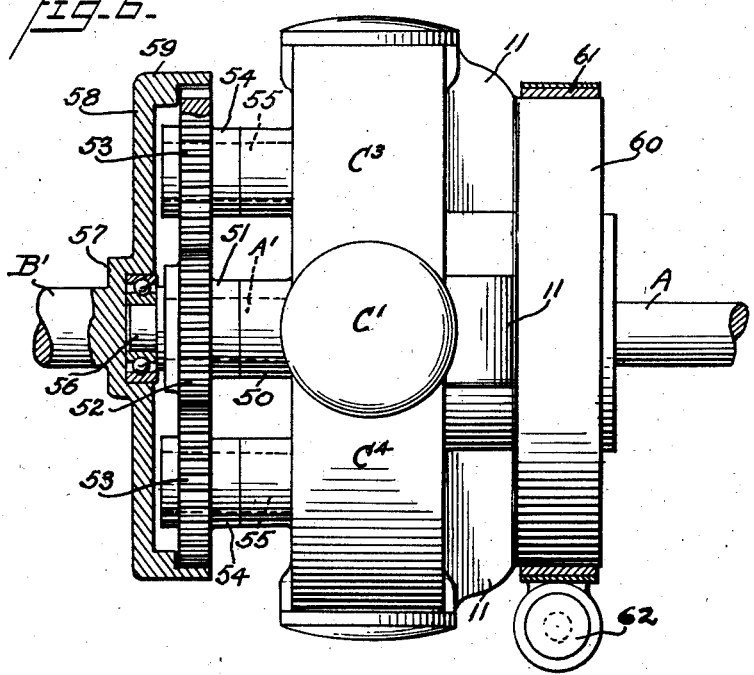
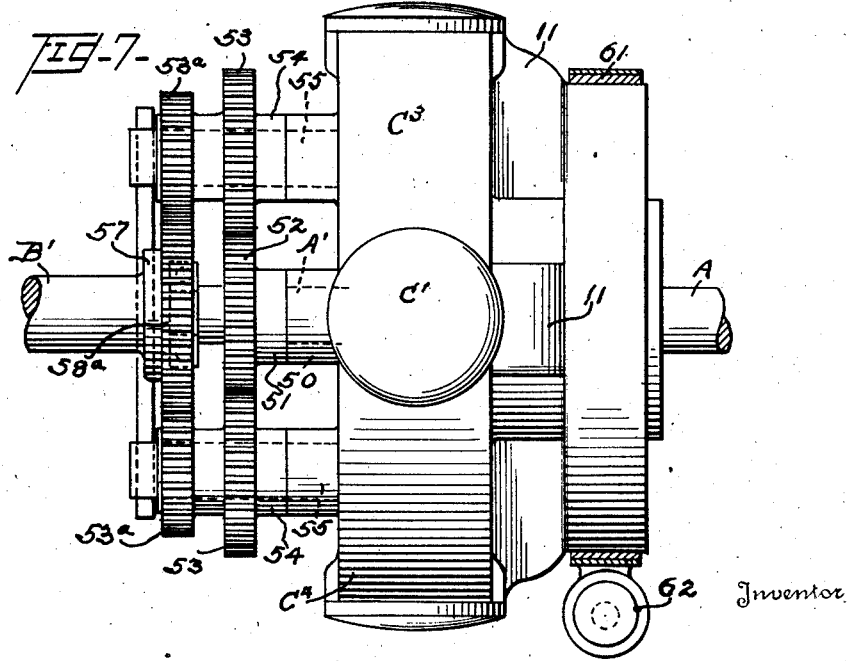

Patented May 14, 1946

2,400,121

UNITED STATES PATENT OFFICE 2,400,121

TORQUE-CONTROLLED LIQUID TORQUE DRIVE

Bertrand Francis Kenyon, Grand Rapids, Mich., assignor to Mechano Gear Shift Company, Grand Rapids, Mich., a corporation of Michigan Application January 28, 1942, Serial No. 428,615

20 Claims. (Cl. 192—60)

This invention is a torque-controlled liquid torque drive adapted for use in connection with air plane, marine and motor vehicle propulsion, and also equally adapted for use with stationary motors and other power transmission mechanism.

One of the objects of the invention is to provide a simple and efficient means of transmitting power by which variable torque is delivered to variable load through the medium of a liquid travelling through an automatically controlled, metered by-pass in a piston driven impulse unit. A further object is to provide a unit in which a constant liquid pressure is maintained by transmitting impulses from the outlets of a multiple outlet pump against liquid contained in a manifold reservoir common to all of the pump outlets, so that the pressures do not react against a dead end, but into a circulating mass of liquid which is always in liquid ratio. Another object is to provide a unit of the character mentioned in which the time and release upon any piston stroke is such as to permit an overlapping by the immediately following stroke, so that the impulses are automatically flattened out. A further object is to provide a power transmission in which the pressure that is imparted at any time, or vibrations of the driving or driven elements of the transmission, are absorbed by the action of an automatically controlled valve, which is so arranged as to vibrate in unison with the pumping strokes. Another object is to provide a self-contained unit embracing driving and driven members, and means for setting up an automatically controlled liquid pressure to connect the members through liquid ratios, and to then hold the load, to drive without liquid circulation, and to remain connected through all ranges down to zero load. An additional object is to provide a unit which is provided with a floating-piston control valve so arranged as to restrict the by-passing of liquid in a ratio related to the speed at which the load is moved. A still further object is to provide a transmission of the character mentioned in which the required quantity of liquid is nominal, resulting in lessening centrifugal force weight, so that there is no problem from overheating, due to the fact that the liquid is not circulating, except for a short period when the driving and driven members are being connected together, and that liquid with as low as 20% lubricating content can be used in low temperatures, because the lubrication is confined to the clutching period.

The invention will be hereinafter disclosed and particularly pointed out in the claims.

In the accompanying drawings:

Figure 1 is a vertical sectional view illustrative of a torque controlled liquid torque drive unit embodying the present invention. Figure 2 is a vertical sectional view on the line 2—2, Figure 1. Figure 3 is a vertical sectional view on the line 3—3, Figure 2. Figure 4 is a horizontal sectional view on the line 4—4, Figure 2. Figure 5 is an enlarged detail sectional view of the control valve. Figures 6 and 7 are top plan views, partly in section, illustrating applications of two forms of "floating" gear drives associated with the unit illustrated in the preceding figures.

Referring to Figures 1 to 5, both inclusive of the drawings, D designates a casing. For purposes of illustration only, and without intent to limit the invention in this respect, the casing is shown as constructed of two complemental members $d$, $d'$, respectively, removably connected with liquid-tight joints in any suitable manner, and provided with a central chamber 10 from which radiate a plurality of cylinders. Any number of cylinders may be provided, but for purposes of illustration and without intent to limit the invention in this respect, four cylinders $C'$, $C^2$, $C^3$ and $C^4$ are shown, all connected with the central cam-chamber 10. Leading from the respective cylinders to a central valve chamber VC are a plurality of "pressure" passages 11, 12, 13 and 14, respectively forming a manifold structure connected with the cylinders $C'$, $C^2$, $C^3$ and $C^4$, there being one pressure passage for each cylinder. In practice, a portion of the casing D is utilized as a reservoir for a liquid L, which is in communication with the several cylinders by means of ports 19, there being one set of such ports for each cylinder, located at positions between the adjacent ends of the pressure passages 11, 12, 13 and 14 and the cam chamber 10. The cylinders also communicate with the pressure passages 11, 12, 13 and 14 by means of ports 15, 16, 17 and 18 respectively. The unit-section $d'$ is provided with a valve chamber VC having a sleeve-like axial extension $d^2$.

As shown in the drawings, a shaft A is projected through the valve chamber VC, and the sleeve $d^2$ into the cam chamber 10. The casing member section $d'$ is provided with an axial hub-like extension 25 around the outer portion of said valve chamber. The casing D is attached to a shaft B in such manner as to rotate therewith. In practice, these shafts are mounted in suitable bearings (not shown). Either of the shafts A and B may be the driving shaft, to be connected with a source of power, such as an engine (not shown). For purposes of illustration, but without intent to limit the invention in this respect the shaft A will be considered to be the driving shaft, which in practice will be connected to a source of power (not shown), and the shaft B the driven shaft.

Suitable piston members P are positioned in reciprocative relation with the various cylinders $C'$, $C^2$, $C^3$ and $C^4$, and as shown in the drawings each piston member consists of two oppositely disposed pistons fixedly connected by an intermediate member. For instance, the piston P' of cylinder C' is connected with the piston P² of cylinder C² by an offset intermediate member 21, and in a similar way the piston P³ of cylinder C³ is connected with the piston P⁴ of cylinder C⁴ by member 21ª. The offset arrangement of the members 21 and 21ª is such as to provide a centrally located space for an antifriction bearing 22 in which is rotatively mounted a cam disk 23, which is secured to the shaft A and projected into the central space provided by the offset members 21 and 21ª.

Located within the valve chamber VC and slidingly mounted in a bearing sleeve $d^3$, is a control valve V of cylindrical form and so located as to extend across the contiguous ends of all of the pressure passages 11, 12, 13 and 14. The circumference of valve V is provided with a plurality of annular metering grooves. It is to be understood in this connection that any number of said metering grooves may be employed, but for purposes of illustrating six grooves are shown and respectively identified by the ordinals 34, 35, 36, 37, 38 and 39. The valve V is normally biased to a valve-open position, i. e. to the left as viewed in Figure 5, by a spring 30, the tension of which may be regulated by means of the abutment 31 adjustably mounted on the sleeve $d^3$. The metering grooves are so positioned that when the driving shaft is at rest all of the grooves are in communication with all of said pressure passages 11, 12, 13 and 14 (see Figure 5), so that a free circulation of oil past the valve is permitted upon the initial starting of the driving shaft. The control valve V is also provided with a metering port 33 near its periphery, which leads from the first or left hand metering groove 34. The total volume of all of the metering grooves is calibrated to create a pressure within valve chamber VC to just start movement of the valve at a predetermined twisting torque of the cylinder unit D against the tension of the spring 30, which is calibrated to a predetermined load.

While the apparatus is at rest, the control valve V is in the extreme left position as viewed in Figure 5, by the tension of the spring 30, which has been previously adjusted to the desired predetermined degree, leaving a slight space between the left end of the valve and the adjacent wall of the valve chamber VC.

In practice, the casing D normally contains more than sufficient liquid L to fill all of the pressure passages 11, 12, 13 and 14, and the grooves 34, 35, 36, 37, 38 and 39 of the control valve V, the level of the liquid while the unit is at rest being indicated by the dotted line 1. The arrangement is such that during rotation of the casing D a centrifugal ring of liquid indicated at L will be maintained in sufficient volume to cover all four of the four series of cylinder intake ports. Any desired liquid may be employed, but it is preferred to use lubricating oil. All oil circulated from the high pressure circuit is returned to casing D, from which it is thrown into the centrifugal liquid ring of which the cored chambers 10ª form a part. In this manner the apparatus is provided with a self-contained liquid body, which, while the unit is rotating, is sufficient to fill all of the cylinders and to drive air from the cylinders and passages.

In operation, when rotation is imparted either to the shaft A or B, as the case may be, the eccentric 23 will tend to effect successive reciprocations of the pistons P', P², P³ and P⁴, so that the cylinders C', C², C³ and C⁴, the pressure passages 11, 12, 13 and 14, and the annular metering channels 34, 35, 36, 37, 38 and 39, and the chamber 33 of valve V are filled with the liquid, and the driving member applies torque to the driven member. At this stage free circulation of the liquid is provided for by the passage area of the circumferential metering grooves 34, 35, 36, 37, 38 and 39 of the control valve V, the total volume of said grooves being so proportioned as to permit free, practically unimpeded circulation of the pressure driven fluid from one cylinder to another until additional speed is applied.

Upon application of power to the drive shaft A connected to a suitable prime mover, said shaft and eccentric 23 will be rotated, and as a consequence the connected pistons will be reciprocated. The valve V being at the position shown in Fig. 5, oil forced out of the cylinder C¹ through the port 15 will flow through the passage 11 to the grooves 34 to 39 inclusive of the valve, and thence to the passage 12 and into the cylinder C²; and in some portions of the compression stroke of the piston P¹ may go into the cylinder C⁴, inasmuch as before the compression stroke of piston P¹ is completed the compression stroke of piston P³ will have begun forcing liquid through the port 18 into the manifold passage 13. This action will occur and there will be no transmission of rotation to the shaft B at low or idling speeds of rotation of the shaft A. Upon increase of the speed of rotation of the shaft A, and more rapid reciprocation of the pistons, pressures will build up in the manifold passages connected with the cylinders, under compression strokes of the pistons, until such pressures are sufficient to overcome the force of spring 30. Liquid flowing from the groove 34 of valve V through the metering passage 33 back of the valve, thereby compresses the spring and simultaneously cuts off communication of the first groove 39 and then in succession the next adjacent grooves 38, 37 and 36 and so on. As each groove is cut off and thereby reduces the volume of liquid passing around the grooved portion of valve V the liquid pressure in the manifold passage increases, thereby insuring a continued flow of oil through the metering passage 33 and moving the valve V to the right (Fig. 2) to its maximum closed position. The valve V will not move farther than shown in Fig. 3 so that the last groove 34 in communication with the passage 33 remains in communication with the manifold passages 11, 12, 13 and 14.

Such increase in pressure acting upon the liquid is of course borne by the pistons. In a short time, depending upon the speed of rotation of the shaft A and the load carried by the shaft B, the pistons will be held against reciprocation and are effectively connected with the eccentric 23, so that said pistons and cylinders and the casing D rotate with the shaft A as a unit, and thus cause the rotation and driving of the shaft B. The speed of rotation of the shaft B will be increased as the pressure builds up back of the valve V and in succession forces the metering grooves out of register with the high pressure manifold passages until the last groove 34 will be the only groove remaining in communication with the manifold pressure channels 11, 12, 13 and 14.

The torque will increase as the speed of the driving member increases, and continues to increase until one of two things happens, i. e. the driven member will either start to rotate, or the regulating valve V will move to closed position i. e. to the right as viewed in Figure 2, against the tension of its spring 30, thereby proportionately cutting off the flow of the pressure fluid from one cylinder to another. If the driven member rotates, the driving and driven members will rotate at different speeds, this being controlled by the ability of the liquid pressure created by the pistons to move the regulating valve against its loaded spring. If, however, the driven member does not rotate under the conditions recited, the resistance of the load thereon will cause each piston to increase the pressure upon the liquid, because the combined volume of the metering grooves of valve V is insufficient to allow of free flow of liquid under these conditions. The increased pressure which builds up because of this retarded liquid flow, causes liquid to by-pass through the metering opening 33 into the valve chamber VC until sufficient pressure is developed to move the valve against the tension of spring 30. It will be readily understood that as the control valve V is moved against the tension of its spring 30, the flow from one pressure passage to another is further restricted because the groove 39 for instance, is first shut off, and as the pressure increases the grooves 38, 37, 36, 35 are successively shut off, thereby progressively increasing resistance to the travel of the liquid from one pressure chamber of one cylinder to another, through the respective pressure channels, the groove 34, however, being at all times in communication with all of the pressure passages so as to insure flow of liquid through the port 33. As resistance to fluid flow at the valve V increases the sealing pressure upon the valve continues to build up until the driven member commences to rotate, the valve having been moved under the increasing pressure, as before stated to gradually reduce fluid flow until the balance of pressure for the desired speed is obtained. By this time the rotation of the driven member will have reached its maximum speed under the load that it is carrying.

From what has been stated herein, it will be understood that during operation of the device, each cylinder takes liquid from the centrifugal oil ring L at each stroke of the bottom piston, and this liquid is either by-passed by the metering channels of the regulating valve V or is put under pressure if its flow is retarded, the extent of such action depending upon the position of the valve V at the time. However, the liquid drawn into the cylinders always remains in the high pressure circuit i. e. under constant pressure exerted by the pistons. In this manner a unit is provided which has a constant liquid pressure due, first to the fact that the pressure from each piston forces the liquid into the whole manifold reservoir, the pressure passages and the valve chamber, and not in the cylinder head alone, so that the pressure is not against a dead end but into a circulating liquid mass while it is in liquid ratio. Second, the timing of the compression and release on any stroke of any piston permits an overlapping by the following stroke, so that the reciprocations themselves are flattened out. Third, any pressure at any time that is imparted from the pistons, engine, or vibrations of driving and driven members are absorbed in the liquid pressure system by the recoil action of the regulating spring-biased valve V, which vibrates in unison with the pistons through the movable by-pass created by said valve and the open ports into the centrifugal liquid ring pressure. Thus, there is provided a high pressure circuit consisting of the spaces in the cylinder heads between the pistons and the outer ends of the cylinders, the several pressure passages 11, 12, 13 and 14, the ports 19 and the by-pass metering grooves 34, 35, 36, 37, 38 and 39 of the valve V, for the restriction of the liquid and the creation of pressure to unite the driving and driven members. The liquid in the high pressure circuit during full idle relation of the parts, with the control valve in full-open position, oscillates back and forth in time with the movements of the pistons, but as restriction is set up by the closing movement of the regulating valve V against the tension of its spring 30, circulation is progressively impeded, and when the valve V has been moved to a position to prevent the flow of liquid from one cylinder to another, the liquid stops circulating and revolves with the whole unit of the driving and driven members. Interruption of circulation locks the pistons to the cam so that the driven member will be rotated by the driving member.

It will be noted that the valve V is located within the casing D in a position to be liquid-balanced in the liquid pressure circuits on its outer circumference, so that it will move freely during its longitudinal opening and closing functions. The valve is also balanced endwise with respect to its spring by the pressure of liquid in the high pressure circuit after the valve has been closed to a point where the flow of the liquid is insufficient to supply added pressure. Thus, the valve is balanced in all particulars, and will vibrate in unison with the pistons having a constant movement under variable power and variable load conditions. The spring, of course, is calibrated to oppose the opening of the valve and acting to close the valve at a predetermined amount of torque from the driving member.

Referring to Figure 6, the clutch and driving unit is illustrated more or less diagrammatically, but it is to be understood that the details thereof are fully illustrated in Figures 1 to 5 of the drawings, and completely described in the preceding portion of this specification. It will be noted that in this embodiment of the invention the driving shaft A is provided with an axial extension A' beyond the plane of the pump cylinders and mounted in a hub-like sleeve 50 projecting from the chamber D. Mounted on the shaft extension A' and rotatable therewith is a hub 51 carrying a drive gear 52. Meshing with said drive gear 52 and at circumferentially spaced positions around it are a plurality of planetary pinions 53, carried by hubs 54, rotatively mounted on stub-shafts 55, fixedly projecting from the casing of chamber D. The driven shaft B' is arranged in axial alinement with the extension A', and is provided with a bearing hub 57 rotatively engaging a reduced portion 56 of said extension. Said hub 57 is enlarged to provide a ring gear 58, having a toothed flange 59 of any desired ratio, which extends over the pinions 53 and meshes with the teeth thereof.

Mounted on the casing of chamber D is a brake drum 60, which may be of any desired construction, such for example as the type of brake drum commonly used on motor vehicles. Cooperating with said brake drum is a brake band 61, which may be operated in any desired manner, such as a hydraulic device 62 being shown for purposes of illustration, but without intent to limit the invention in this particular.

One of the objects of the structures illustrated in Figures 6 and 7 is to help increase the number of reciprocations of the pistons of the unit in picking up the load. This is accomplished in the form illustrated in Figure 6 by the gear 52, the pinions 53 and the ring gear 58. For instance, as the control valve V starts to close and to thereby progressively set up increasing pressure upon the liquid circulation, the pinions 53 will travel in an orbit about gear 52, and will rotate at a speed proportionately related to that pressure. When the valve V has reached the limit of its closing movement and the grooves thereof are at their extreme throttling positions, the oil ratio in the pumping unit will cease, whereupon the pinions 53 will cease rotating in ratio, and thereby effect a locking engagement of the gear 52, the pinions 53 and the ring gear 58, so that the entire unit, including the driving shaft A, the chamber D and the driven shaft B' will rotate as one.

Another function of the gear arrangement of Figures 6 and 7 is that in case of a shock load from the driven end being greater than the torque at the driving end, the gears tend to increase the speed of the driven shaft B' and to drive in the direction of rotation, thus furnishing an additional shock absorber.

By applying pressure upon the brake drum 60, the shaft B' will be caused to rotate in a reverse direction, because planetary travel of the pinions 53 is prevented and the said pinions and the gear ring will be caused to function as a reverse gearing.

The gearing arrangement of Figure 7 is a modification of that illustrated in Figure 6. Referring to said Figure 7, the elements of the clutch and driving unit are the same as shown in Figure 6. The chamber D is also provided with a bearing sleeve 50 for the shaft extension A', and a hub 51 carrying a drive gear 52 is mounted on and rotatable with said extension. The driven shaft B' is also provided with a hub portion 57 which is in rotative engagement with the reduced portion 56 of said extension A'. In the form of the invention illustrated in Figure 7 the hubs 54 mounted upon stub shafts 55 are each provided with two pinions 53 and 53a rotatable therewith, the pinions 53 being in engagement with the gear 52 in a manner to permit travel thereof in an orbit around said gear. The pinions 53a are in mesh with a driven gear 58a carried by the hub 56 of the shaft B'. The operation is substantially the same as heretofore described in connection with Figure 6, the pinions 53a and gear 58a being substituted for the ring gear 58.

The advantages of the invention will be readily understood by those skilled in the art to which it belongs. For instance, it will be readily seen that a simple and inexpensive torque controlled liquid torque drive unit is provided in which a driving and a driven member may be effectively connected through a liquid medium, and operating in direct relation to variations of pressure upon the liquid controlled by the position of the regulating valve. By means of this arrangement any increase in speed will set up a complemental liquid pressure in the pumping devices, and thereby tighten the engagement of the operating eccentric with the pistons. At the same time movement of the control valve to closed position against a calibrated spring or its equivalent is automatically effected, whereby the proportion of the driving-members-torque to the valve is established, and both members are caused to revolve and drive one to one, at which time there is no pumping action or liquid movement.

Another advantage of the invention is that the calibrated passages provided by the control valve prevent shock, by allowing a time element for valve-closing, even when complete power is applied at once. Thus, in the travel from idle status through all of the oil ratios to direct driving position, the spring load in front of the valve resists valve movement. This prevents more than a predetermined amount of load being applied against the unit, so that all driving is solely accomplished by confined liquid pressure instead of friction. Another advantage is that a rotating driving member is so arranged as to transmit its power to a driven member, without shock, from idle, through decreasing liquid ratio to full speed ratio. In other words, the drive is through a liquid cushion, by means of a revolving eccentric on the driving member, whereby the pumps are operated to restrict and direct liquid in the pump cylinders and in a manifold liquid circuit. In this manner pressure is created in the circuit which will tighten the engagement of the eccentric with the pump pistons, and thereby hold the drive to a speed-ratio proportionate to the ability of the power of the driving member to drive the load of the driven member. Another important advantage is that a cylindrical control valve is so arranged as to be balanced by equal liquid pressure around its sides, and to be moved axially by pressure measured by the ability of the power or load to close the calibrated portions of the valve, and thereby further restrict the liquid in the pressure circuit by diverting liquid therefrom through a metered passage to a position where the liquid pressure will counterbalance the tension of the calibrating spring until a stage of equilibrium is obtained. In this manner the percentage of the drive in oil ratio is regulated before a complete lock, and valve opening movement resisted until pressure is relieved. Another advantage is that after idle speed status is exceeded, any speed or torque of the driving member and any load of the driven member are caused to approach to the same speed through varying liquid ratio, and in as short a time as the power exerted can carry the load at the higher speed.

A further important advantage is that the driving and driven members form a single unit, in which, as long as the control valve is in its open position, the driving member can rotate without driving the driven member. However, when the valve is moved toward and eventually to its closed position, and against the tension of its spring, a connection of the driving and driven member begins. This initial connection thereby locks the driving and driven members together at a set time and at a set torque, and always driving through an oil cushion—never metal to metal—and without movement of the liquid while in full engagement.

The present invention is applicable in many relations as in applying brakes, either primary or secondary or both; for changing the pitch of an airplane propeller; changing the valve opening of a steam engine so as to take advantage of the expansion of steam; as a substitute for separable clutches used between the driving and driven shafts in many machines, such as motor vehicles and the like, and for connecting any load to be driven by power unit.

The variable torque force delivered to a variable or fixed load provide a liquid pressure which is restricted by a variable by-pass area in the valve, with a controlled flow of liquid into the chamber back of the valve, thereby maintaining a variable volume and a liquid pressure equal to the variable-delivered torque with the movement control. The automatic movement of the valve V changes the liquid displacement of the manifold, which is supplied with liquid from centrifugal ring L through the ports 19, on torque increase and discharges liquid into said ring on torque decrease.

These forces, operating in their cycle of set timing, provide for the function of the drive, and permit idling in any position, ability to transmit torque, and a liquid power take-off control through liquid pressure.

The liquid high compression circuit includes the liquid in the cylinder heads, the manifold passages, the grooves around the valve and the space between the valve and the chamber back of the valve. The valve chamber in the high compression circuit performs three functions. It maintains equalized torque control for the drive. It houses the equalized pressure which supplies pressure to operate any desired mechanical or pressure unit, separately from the drive, and it furnishes a variable torque pressure from which torque delivery can be registered.

The low pressure centrifugal liquid ring at L provides liquid to keep the ports 19 covered, so that the high pressure manifold is liquid sealed at all times. The vacuum which occurs in the functioning of the unit is the vacuum produced on the suction strokes of the pistons, which the ring L assists the centrifugal pressure under which the ring L is operating and supplying liquid through the ports 19 to the cylinders.

The central portion of the casing within the liquid ring L is an atmosphere center of the unit. All of these factors mentioned with respect to the invention function on a properly coordinated timing in the cycle of the apparatus, with centrifugal liquid feeding pressure increasing as torque increases, so that set timing operates equally at all speeds. It is also liquid driven during the maximum liquid circulation as well as when the driven member is operating at the ratio of 1 to 1 between the driving and driven members with the minimum of liquid circulation.

The construction described has been built and thoroughly tested and proved exceptionally successful in operation. The apparatus described is of a relatively simple and very durable character. It illustrates a practical embodiment of the invention and one that has been successfully demonstrated. The invention, however, is not to be considered as limited to the one specific construction disclosed but is to be comprehensive of all forms of structure coming within the claims hereto appended defining said invention.

Having thus explained the nature of the invention and described an operative manner of constructing and using the same, although without attempting to set forth all of the forms in which it may be made, or all of the forms of its use, what is claimed is:

1. A torque-controlled liquid torque drive of the character described having in combination a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, means for maintaining said pumping devices in communication with each other so as to provide fluid circulation from one to the other, means connected with the other member for reciprocating said pistons, a single valve for controlling the intercommunication of all of said cylinders, and means for yieldingly holding said valve in a normally open position with respect to said communication means, said valve having a portion exposed to the fluid pressure created by the pumping devices, so that the valve will be automatically moved to variable opening positions in response to variations of said fluid pressure.

2. A torque-controlled liquid torque drive of the character described having in combination a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, means within the casing providing a plurality of pressure channels connected with the respective cylinders, means connected with the other member for reciprocating the pistons, a single control valve common to all of said passages, and means for yieldingly holding said valve in a normally open position with respect to said pressure channels, said valve having a portion exposed to the fluid pressure within said channels, so that the valve will be automatically moved to variable opening positions in response to variations of said fluid pressure within the channels.

3. A torque-controlled liquid torque drive of the character described having in combination a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, means within the casing providing a plurality of pressure channels connected with the respective cylinders, means connected with the other member for reciprocating the pistons, a valve chamber connected with all of said pressure channels, a valve movably mounted within said valve chamber and having means for variably controlling flow of liquid through all of the pressure channels in proportion to the torque applied to the driving member, and means for yieldingly holding said valve in a normally open position with respect to said pressure channels, said valve having a portion exposed to the fluid pressure within said channels, so that the valve will be automatically moved to variable opening positions in response to variations of said fluid pressure within the channels.

4. A torque-controlled liquid torque drive of the character described having in combination a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, means within the casing providing a plurality of pressure channels, one for each cylinder, means connected with the other member for reciprocating the pistons, a valve chamber connecting all of said pressure channels, a common valve reciprocatively mounted within said valve chamber for controlling liquid flow through all of said channels, and means for normally biasing said valve to open position, said valve having means for constantly maintaining communication between said pressure channels and the valve chamber, said valve having a portion exposed to the fluid pressure within the pressure channels, so that it will be automatically moved to variable open positions in response to variations of pressure within said channels.

5. A torque-controlled liquid torque drive of the character described having in combination a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, means connected with the other member for reciprocating said pistons, a valve chamber within said casing, means within the casing providing a plurality of pressure channels connecting all of the respective cylinders and said valve chamber, a valve movably mounted within said valve chamber, and means for yieldingly holding said valve in a normally open position with respect to said pressure channels, said valve having a portion exposed to the fluid pressure within said channels, so that the valve will be automatically moved to variable opening positions in response to variations of said fluid pressure within the channels.

6. A torque-controlled liquid torque drive of the character described having in combination a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, a valve chamber within said casing, means within the casing providing a plurality of pressure channels connecting all of the respective pump cylinders with said valve chamber, means connected with the other member for reciprocating said pistons, a valve movably mounted within said valve chamber and provided with means for establishing communication between said channels, and means for yieldingly holding said valve in normally open position, said valve having a portion exposed to the fluid pressure within said channels, so that the valve will be automatically moved to variable opening positions in response to variations of said fluid pressure.

7. A torque-controlled liquid torque drive of the character described having in combination a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, means within the casing providing pressure channels connected with the respective cylinders, means connected with the other member for reciprocating the pistons, a control valve having a plurality of circumferential grooves controlling flow of liquid through said channels, said valve having a portion exposed to the fluid pressure within said channels, so that the valve will be automatically moved to variable opening positions in response to variations of said fluid pressure.

8. A torque-controlled liquid torque drive of the character described having in combination, a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, means connected with the other member for reciprocating said pistons, means within the casing providing a plurality of pressure channels connected with the respective cylinders, a valve chamber connecting all of said channels, a control valve located within said chamber and common to all of said passages, said valve having a plurality of annular metering channels to variably control flow of fluid through said pressure channels, one of said metering channels being at all times in register with all of said pressure channels, and means for holding said valve in a predetermined position so as to place all of said metering grooves in connection with all of said pressure channels, said valve having a portion exposed to the fluid pressure within said channels, so that the valve will be automatically moved to variably position the metering grooves with respect to said channels in response to variations of said fluid pressure.

9. A torque-controlled liquid torque drive of the character described having in combination, a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, means connected with the other member for reciprocating said pistons, a valve chamber, means within the pumping unit providing a plurality of pressure channels connecting all of the cylinders with said valve chamber, a valve movably mounted in said chamber and provided with a plurality of circumferential metering grooves positioned to register with said channels, means for biasing said valve to a predetermined position, and means connected with one of said metering grooves for conducting fluid to said valve chamber at a position to automatically operate said valve in response to variations of fluid pressure created in said channels.

10. A torque-controlled liquid torque drive of the character described having in combination a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, means connected with the other member for reciprocating said pistons, a valve chamber, means within the casing providing a plurality of pressure channels all of which are connected with said valve chamber, a valve movably mounted in the valve chamber and having a plurality of circumferential metering grooves for controlling flow of liquid through said channels, there being one of said grooves always in communication with said channels irrespective of the position of the valve, means acting upon one end of said valve for normally biasing it to an open position, and means for connecting said last mentioned metering groove with the valve chamber at the other end of the valve, so as to automatically operate the valve in proportion to variations of pressure within said pressure channels.

11. A torque-controlled liquid torque drive of the character described having in combination, a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, means connected with the other member for reciprocating said pistons, a valve chamber closed at one end and open at the other, means within the casing providing a plurality of pressure channels all of which are connected with the valve chamber, a valve slidingly mounted in said valve chamber, said valve having a plurality of circumferential metering grooves for controlling flow of liquid through said pressure channels, there being one of said grooves always in communication with said channels irrespective of the position of the valve, and means for yieldingly moving said valve toward the closed end of the valve chamber, said valve also having a metering port connecting the last mentioned groove to the valve chamber at a position between the end wall of the latter and the adjacent end of the valve so as to variably and automatically operate said valve in proportion to variations of pressure within said channels.

12. A torque-controlled liquid torque drive of the character described having in combination, a driving member, a driven member, a casing secured to one of said members and provided with a chamber adapted to contain liquid, pumping devices within said chamber each consisting of a cylinder carried by the casing and in communication with said chamber and a complemental piston for each cylinder, means connected with the other member for reciprocating said pistons, means providing a plurality of pressure channels connected with the respective cylinders, a control valve common to all of said passages and having means for variably controlling the flow of liquid through them in proportion to the torque applied to the driven member by the driving member, a spring for maintaining said valve in a normally open position, and means for varying the tension on said spring, said valve having a portion exposed to the fluid pressure within said pressure channels, so that the valve will be automatically moved against the tension of said spring to variable opening positions in response to variations of said fluid pressure, said valve also having means to by-pass liquid from said channels to a position adjacent to said pressure-exposed portion.

13. A torque-controlled liquid torque drive of the character described having in combination, a driving member, a driven member, a casing secured to one of said members and provided with a chamber adapted to contain liquid, pumping devices within said chamber each consisting of a cylinder carried by the casing and in communication with said chamber and a complemental piston for each cylinder, means connected with the other member for reciprocating said pistons, means providing a plurality of pressure channels connected with the respective cylinders, a valve chamber connected with all of said channels, a single control valve axially movable within said valve chamber and having means for variably controlling flow of liquid from any one channel to another in proportion to the torque applied to the driven member by the driving member, and a spring for maintaining said valve in normally open position, said valve having a portion exposed to the fluid pressure within said channels so that the valve will be automatically moved against the tension of said spring, to variable opening positions in response to said fluid pressure.

14. A torque-controlled liquid torque drive of the character described having in combination, a driving member, a driven member, a casing secured to one of said members and provided with a chamber adapted to contain liquid, pumping devices within said chamber each pumping device consisting of a cylinder carried by the casing and in communication with the chamber and a complemental piston for each cylinder, said pistons being connected in pairs, an eccentric connected with the other member for reciprocating said pistons, and means within the casing providing a plurality of pressure channels, there being a separate pressure channel for each cylinder, and a single control valve common to all of said passages, means for yieldingly holding said valve in a normally open position, said valve having means for variably controlling flow of liquid from one channel to another in proportion to the torque applied to the driven member by the driving member, said valve also having a portion exposed to the pressure within said pressure channels so that the valve will be automatically moved to variable opening positions in response to variations of said fluid pressure.

15. A torque-controlled liquid torque drive unit having in combination a driving member, a driven member, a fluid pressure means for operatively connecting the driving member and the driven member, said pressure means comprising a manifold structure carried by one of said members, said manifold structure having a plurality of converging pressure passages therein, and means operated by the other member for circulating fluid under pressure through the manifold passages, and means operated by the fluid pressure within the manifold structure for automatically varying the fluid pressure in said passages in proportion to the torque applied to the driven member by the driving member.

16. A torque-controlled liquid torque drive unit having in combination a driving member, a driven member, a fluid pressure means for operatively connecting the driving member and the driven member, said pressure means comprising a multi-passage manifold structure carried by one of said members, said manifold structure having a plurality of converging pressure passages therein, and means operated by the other member for circulating fluid under pressure through the manifold passages, and a single control valve common to all of said passages and having means for variably controlling flow of liquid through the passages, said valve having a portion exposed to the pressure of said fluid, so as to be automatically operated in response to variations of fluid pressure in said passages.

17. A torque-controlled liquid torque drive of the character described having in combination a driving member and a driven member, fluid pressure means for operatively connecting the driving and driven members, said pressure means comprising a manifold structure carried by one of said members and provided with a plurality of converging radially arranged passages and means operated by the other member for circulating fluid under pressure through said passages, a central valve chamber communicating with all of said passages, a valve having means for variably controlling the flow of liquid through the passages, said valve having a portion exposed to the pressure of said fluid, so as to be automatically operated in response to variations of fluid pressure in said passages.

18. A torque-controlled liquid torque drive of the character described having in combination a driving member and a driven member, a casing secured to one of said members, said casing having a chamber adapted to contain liquid, pumping devices located within and in communication with the chamber, said pumping devices having means for communication with each other in such manner as to provide fluid circulation from one to the other, means connected with the other member for operating said pumping devices, and a single valve controlling the intercommunication between the pumping devices, said valve having a portion exposed to the pressure of said fluid, so as to be automatically operated in response to the variations of fluid pressure created by the pumping devices.

19. A torque-controlled liquid torque drive of the character described having in combination a driving member and a driven member, a casing secured to one of said members, said casing having a chamber adapted to contain a liquid, pumping devices located within and in communication with the chamber, said pumping devices having means for communication with each other in such manner as to provide fluid circulation from one to the other, means connected with the other member for operating said pumping devices, a single spring pressed valve associated with said pumping devices, said valve having a portion exposed to the pressure of said liquid, so as to be automatically moved against the spring pressure thereon, whereby the volume of liquid flow from one piston to another is reduced upon predetermined increase of liquid pressure created by the pumping devices.

20. A torque-controlled liquid torque drive of the character described having in combination a driving member, a driven member, a casing secured to one of said members and provided with a chamber adapted to contain liquid, pumping devices within said chamber, each pumping device consisting of a cylinder carried by the casing and in communication with said chamber and a complemental piston for said cylinder, means connected with the other chamber for actuating said pistons, means within the casing providing a plurality of pressure channels one of which is connected with each of the respective pump cylinders, and so arranged as to maintain circulatory streams of liquid between oppositely disposed pumping devices, and a single control valve for all of said passages, means for yieldingly holding said valve in a normally open position with respect to all of said pressure channels, said valve having a portion exposed to the fluid pressure within said channels, so that the valve will be automatically moved to variable opening positions in response to variations of fluid pressure within said channels.

BERTRAND FRANCIS KENYON.